US010559012B1

(12) United States Patent
Mosam

(10) Patent No.: US 10,559,012 B1
(45) Date of Patent: Feb. 11, 2020

(54) INCOME DISTRIBUTION BASED ON USER CONSUMPTION OF CONTENT

(71) Applicant: Chicken Soup for the Soul Entertainment, Inc., Cos Cob, CT (US)

(72) Inventor: Adam Mosam, Costa Mesa, CA (US)

(73) Assignee: Chicken Soup for the Soul Entertainment, Inc., Cos Cob, CT (US)

( * ) Notice: Subject to any disclaimer, the term of this patent is extended or adjusted under 35 U.S.C. 154(b) by 0 days.

(21) Appl. No.: 13/651,360

(22) Filed: Oct. 12, 2012

(51) Int. Cl.
G06Q 30/00 (2012.01)
G06Q 30/02 (2012.01)

(52) U.S. Cl.
CPC .................. *G06Q 30/0272* (2013.01)

(58) Field of Classification Search
CPC ...................... G06Q 30/00–30/0284
USPC ............................. 705/14.1–14.73
See application file for complete search history.

(56) References Cited

U.S. PATENT DOCUMENTS

2011/0321072 A1* 12/2011 Patterson ......... H04N 21/44222
725/5
2012/0096526 A1* 4/2012 Brahmanapalli ..... H04L 9/3234
726/6

* cited by examiner

Primary Examiner — John Van Bramer
(74) Attorney, Agent, or Firm — Patent Law Works LLP

(57) ABSTRACT

This disclosure is directed to systems and methods for enabling users to create and manage their own channels to stream digital content or media for viewing, sharing, downloading, etc., by others. Users who create the channels are designated as editors and accorded a status that allows them to invite contributing publishers or authors to supplement their channels with additional digital content or media for viewing, listening, sharing, downloading, etc. The editors and the publishers or authors who contribute to a particular channel receive payments that are computed based on determining the extent of either viewing, listening, sharing, downloading, etc., of the digital content, by users, or determining the total playback time of the digital content for users and computing a viewing score. The systems and methods provide analytics relating to the content to the editors or the platform providers as desired.

21 Claims, 15 Drawing Sheets

Example Content Type Weight Assignment

| Content Type | Weight |
|---|---|
| Audio | 3 |
| Video | 4 |
| Text | 2 |
| HD Video | 5 |

Example Social Network Signal Weight Assignment

| Social Network Signal Type | Weight |
|---|---|
| Number of Plays | 2 |
| Total Playback Time (e.g., total number of seconds the media has been played by all users) | 6 |
| Number of Times Shared on Social Networks | 3 |
| Number of Times "Favorited" | 4 |
| Rating (likes/dislikes) | 5 |

Example Split Revenue between Parties

| Parties | Percentage |
|---|---|
| Platform Provider | 30% |
| Editor | 10% |
| Authors | 60% |

INCOME DISTRIBUTION BASED ON USER CONSUMPTION OF CONTENT

BACKGROUND

The present disclosure relates to social content or media that is available for access by users via the internet. In particular, the present disclosure relates to systems and methods for creating or contributing to channels (by a single or multiple entities) for delivering social content or media to users and computing and distributing income based on user consumption of content. The systems and methods manage these channels by determining extent of viewing, listening, sharing, downloading, etc., of particular content or media by others and allocating payment amounts based on the total extent of viewing, listening sharing, downloading, etc., by others, that is, the "total playback" time of the particular content.

In recent years, there has been tremendous growth in a variety of viewing and listening platforms for either displaying and/or playing content and media of all types for viewing and/or listening by people that are interested. Some platforms, for example, "YouTube," display short video excerpts, for example, "viral videos" that are entertaining and free. Yet, there is other digital media that has no avenue for viewing, sharing, downloading, etc., despite viewer interest, much less, for any kind of re-numeration. Typically, different types of media generate varied levels of interest among people. There is always an audience for different types of digital media, yet in some instances, the audience is unaware of how to locate the digital media that is of particular interest to them.

More recently, technology offers paid entertainment content (for example, videos, music etc.) that users may stream directly to their smartphones, computers, televisions, or the like. Although the use of paid-content providers has been growing in recent years, there is increasing frustration with advertisement-based media services, which are causing dramatic drops in subscriptions for viewing of paid entertainment.

With the ongoing trends and growth in viewing, sharing, downloading, etc. of social content, it would certainly be beneficial to find better ways and platforms to provide content and media for viewing, sharing, downloading, etc. by those who are interested.

SUMMARY

Any deficiencies or limitations of existing technologies are overcome, at least in part, by providing technology including systems and methods (configured to provide a platform) for enabling content creators and providers to create and manage their own channels for streaming digital content or media (e.g., audio, video, text, or HD video), for viewing, listening, sharing, downloading etc., by others. In some implementations of this technology, entities (also referred to as parties or users throughout this document) who create the channels are designated as "editors" and accorded a designation or status that allows them to invite contributing "publishers" or "authors" to supplement their channels with additional digital content or media for viewing, sharing, downloading, etc. by others. The "editors" and the contributing "publishers" or "authors" of a particular channel receive payments that are computed by determining the total extent of viewing, listening, sharing, downloading etc., by an audience interested in the particular digital content on the particular channel. The total extent of viewing may be the "total playback" time of particular content, while a user is either, viewing, listening, sharing or downloading it. A viewing score for the editors or contributing publisher of content is determined and payments are computed based on this viewing score. The viewing score is determined by assigning weights to content based on predetermined criteria, for example, how many times a particular media item was either viewed, shared, or downloaded, or the total time for any of these acts, in a predetermined period of time (for example, a week, month, or other time frame). The systems and methods provide analytics relating to the digital content or media to the editors.

In some embodiments, the methods of this technology for creating one or more channels for providing digital content for viewing, listening, sharing, downloading, etc., include one or more operations using one or more computing devices, for 1) receiving a request from one or more parties to create one or more channels; 2) providing the one or more parties with one or more options, to specify one or more conditions relating to the one or more channels; 3) enabling uploading of digital content from the one or more parties who may create the channels and other contributing parties who may add digital content; 4) determining an extent of viewing, listening, sharing, downloading, etc., of digital content in the one or more channels, which may be the total playback time during which users are exposed to the particular; 5) generating viewing scores for the various parties; and 6) computing one or more payment amounts for the parties, based at least in part on, the viewing scores.

In some embodiments, the systems of this technology for creating and managing one or more channels configured for providing content for viewing, listening, sharing, downloading, etc., have one or more computing devices and include 1) a channel creation module configured to a) receive a request from one or more users who request creation of one or more channels and b) provide the one or more users with one or more options to specify one or more conditions for creation of the one or more channels; 2) a content management module configured to enable uploading of certain content by the one or more users who create the one or more channels and certain other content by the one or more contributing parties who desire to add content to the one or more channels, the content management module further configured to designate the content type; 3) a viewing score module configured to track viewing (or sharing, listening, or downloading, etc.) of the content on the one or more channels and determine a viewing score for each of the one or more users and the one or more contributing parties; and 4) a revenue allocation module configured to compute one or more payment amounts for the one or more users and the one or more contributing parties, based at least in part on, the viewing scores. The revenue allocation module may consider the "total playback" time of the particular content, during which users perform one or more of either view, listen, share, or download the particular content of interest to them.

BRIEF DESCRIPTION OF THE DRAWINGS

The present disclosure is illustrated by way of example, and not by way of limitation, in the figures of the accompanying drawings, in which like reference numerals are used to refer to similar elements.

FIG. 6A is a table illustrating an example of weights assigned to various content types.

FIG. 6B is a table illustrating an example of weights assigned to social network signals.

FIG. 6C is a table illustrating an example of a revenue scheme with revenues computed and allocated among the various parties, for example, a platform provider, an editor, and authors, based on extent viewing, listening, sharing, or downloading, and total playback time.

FIG. 8 is a graphical representation of an example user interface display illustrating various features or options for managing channels.

DETAILED DESCRIPTION

Figure 1:
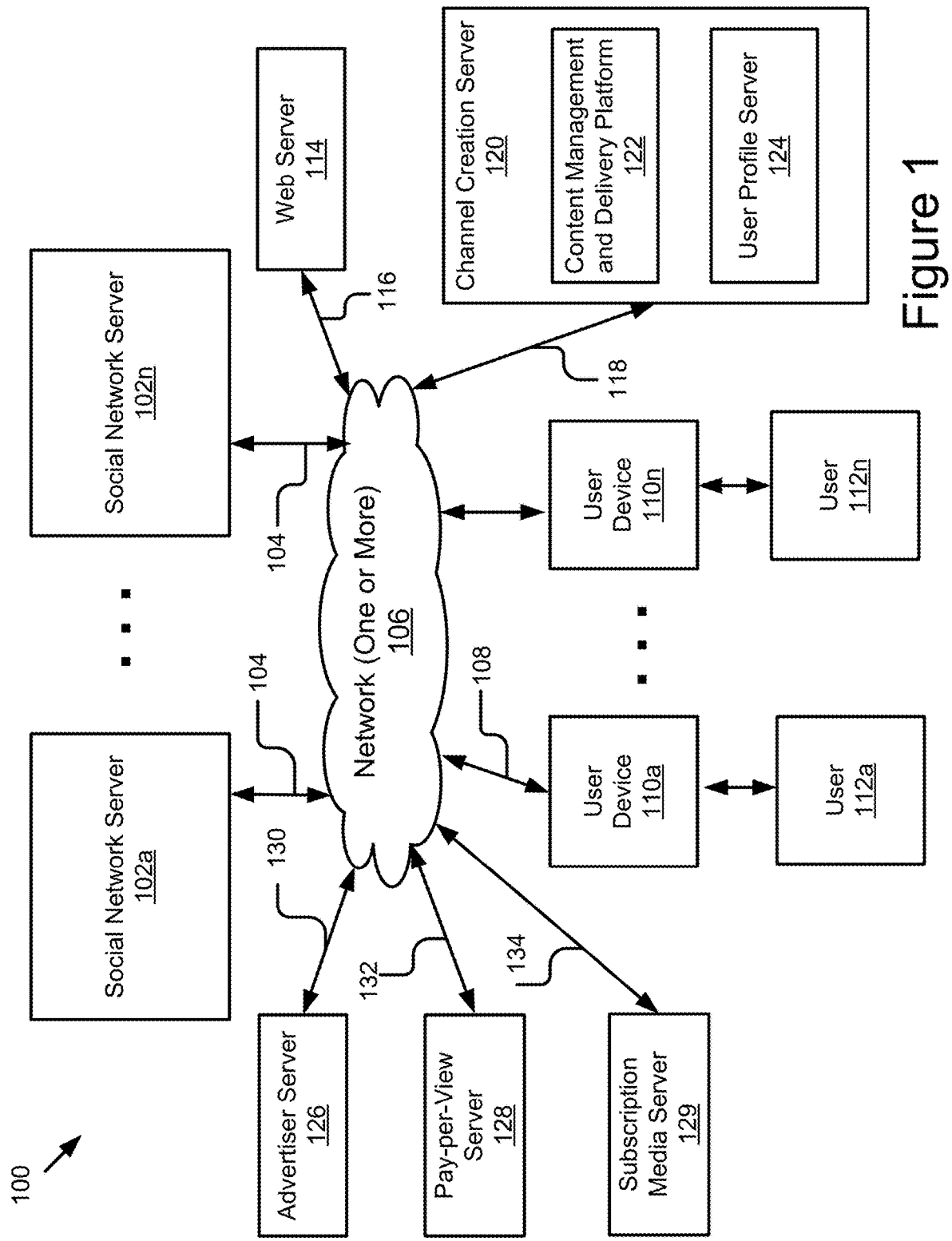
FIG. 1 is a high-level block diagram illustrating some embodiments of systems for creating and managing social content or media (e.g. audio, video, text, and HD Video).

In some embodiments, this technology is directed to systems and methods for creating, contributing, managing, and delivering content (e.g. social, digital, or the like), via the internet. Content creators or providers may create a channel (for streaming the content or media) or contribute to another's existing channel. These content creators or providers may select a suitable revenue payment scheme, add their individual particulars (for example, logo, brand, background image etc.), and create or select one or more themes for their respective channels. After the channels are set up with a platform provider, in some implementations, the platform provider (via a central unit) may manage user accounts, compute payment allocations and distributions based on extent of viewing, listening, sharing, and downloading etc., content, including total "playback" times of the content, and make payments, store credit card information etc. Content or media may be uploaded in a variety of ways. As one example, a particular content creator designated as an "editor" may add or upload video, audio, or other media, via a user interface (e.g., "publisher console"). Once the content or media is uploaded, it is encoded and then shared with others.

In some implementations, the user interface is configured to provide access to media from any location or device, a particular user's desktop, telephone, or tablet. The user interface has a functionality that remembers where a particular user left off in viewing, sharing, downloading, etc. media and continues from the same location when the user switches devices. The user interface provides bookmarking functionality to permit users (editors, authors, or viewers) to bookmark interesting locations in the media, by marking main sections, chapters, and even make notes. The user interface also has playback features, permitting users to playback either of their audio or video content. In addition, embedded digital media tools may easily assist viewers of the content or media broadcast to others about a particular user's channel and media. It should be recognized that the terms content and media are interchangeably used throughout this description.

At periodic intervals that may be predetermined by the platform provider, in the event of multiple contributors, the systems and methods of the technology calculate a viewership score for the editor or author (or particular content) who contribute to a particular channel, and utilize a payment scheme for computing the income generated and allocate payments.

As described above, a user who initiates a channel may be designated as an "editor." An editor may invite other users to contribute to his or her channel. A contributor may be designated as an "author" or "publisher." More contributors result in more media for viewing, sharing, downloading, etc., and more media assures an active, robust, and engaging channel for streaming media. In some implementations, the systems and methods provide a platform that permits multiple creators of content to contribute to the same channel. This permits collaborative publishing of content or media by a plurality of editors.

In other implementations, an editor may initially create a channel, and may invite other collaborators (authors or publishers) to assist with either creating content or media or simply add in additional content. Multiple collaborators feeding a single digital stream of content make it interesting and lively for viewers.

In some implementations of the technology, those users who are designated editors may be accorded high-level administrative capabilities for navigating the platform configured to serve creators and publishers of different types of content. At predetermined periodic intervals, viewing, sharing, downloading, etc. of each contributor's content is measured and a payment scheme is used to determine revenues for each user.

In some implementations, the systems and methods provide useful analytics to users. As one example of a use scenario, after a performance, many entertainers typically distribute DVDs or CDs of their work, creating a lot of physical media in an age when physical media is declining. Entertainers may make their work available to their audiences with no physical media to produce or stock. This technology provides a platform to provide analytics to assist these entertainers understand the aspects of their work that are most popular. With this knowledge, entertainers may make future entertainment decisions that are informed.

As another example of a use scenario, speakers typically may make their ideas and talks available. This technology provides an avenue by which conferences may offer an alternative option to attending conferences, for example, by providing a record of the discussions (video and audio content) and materials exchanged at conferences to those who were unable to to attend in person. As yet other examples of use scenarios, instructional content produced by skilled professionals, such as designers, artists, experts on a particular subject, or the like, may be provided for instant streaming, via subscription or pay-per-view.

In the following description, for purposes of explanation, numerous specific details are indicated in order to provide a thorough understanding of the technology described. It should be apparent, however, that this technology may be practiced without these specific details. In other instances, structures and devices are shown in block diagram form in order to avoid obscuring the technology. For example, the present technology is described with some embodiments below with reference to user interfaces and particular hardware. However, the present technology applies to any type of computing device that may receive data and commands, and any devices providing services. Moreover, the present technology is described below primarily in the context of enabling editors of content to create their own channels to stream their digital content, however, it should be understood that the present technology may deviate from the embodiments disclosed.

Reference in the specification to "one embodiment or implementation," "an embodiment or implementation," or "some embodiments or implementation" means simply that one or more particular features, structures, or characteristics described in connection with the one or more embodiments or implementations is included in at least one or more embodiments or implementations that are described. The appearances of the phrase "in one embodiment or implementation" in various places in the specification are not necessarily all referring to the same embodiment or implementation.

Some portions of the detailed descriptions that follow are presented in terms of algorithms and symbolic representations of operations on data bits within a computer memory of either one or more computing devices. These algorithmic descriptions and representations are the means used by those skilled in the data processing arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms such as "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology may take the form of an entirely hardware embodiment, an entirely software embodiment, or an embodiment including both hardware and software components. In some embodiments, this technology is implemented in software, which includes but is not limited to firmware, resident software, microcode, etc.

Furthermore, one or more of this technology or the technology as a whole may take the form of a computer program product accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

Example Systems

FIG. 1 is a high-level block diagram illustrating some embodiments of systems for enabling users (for example, content creators or providers) to create or contribute to one or more channels for streaming digital media and managing and delivering it to others for viewing, sharing, downloading, etc. In FIG. 1, the system indicated generally by reference numeral 100 illustrates a distributed architecture.

The system 100 illustrates one or more social network servers 102a, 102b, through 102n and a channel creation server 120, which users may access, via user devices 110a through 110n, to connect to the channel creation server 120 or any one of the social network servers 102a through 102n. These entities are communicatively coupled via one or more networks 106.

Moreover, it should be recognized that while the present disclosure is described below primarily in the context of creating or contributing to channels for streaming and sharing digital media with a variable payment scheme, the present disclosure may be applicable to other situations where this technology is necessary or desired. For ease of understanding and brevity, the description of the present disclosure is described only in reference to systems and methods for creating, contributing to, or managing channels for streaming and sharing of digital media with a variable payment scheme.

The user devices 110a through 110n in FIG. 1 are illustrated by way of example. Although FIG. 1 illustrates only two devices, the present disclosure applies to any system architecture having one or more user devices 110, therefore, any number of user devices 110n may be used. Furthermore, while only one network 106 is illustrated as coupled to the user devices 110a through 110n, the social network servers, 102a-102n, a web server 114, the channel creation server 120, and the other servers including an advertiser server 126, a pay-per-view server 128, and a subscription media server 129, in practice, any number of networks 106 may be connected to these entities. In addition, the system 100 may include any number of other third party servers (not shown) in the event certain functionalities of the systems illustrated are performed by different third parties.

The social network server 102a is coupled to the network 106 via a signal line 104. The social network server 102a illustrated typically includes a social network application, which comprises the software routines and instructions to operate the social network server 102a and its functions and operations. Although only one social network server 102a is described here, persons of ordinary skill in the art should recognize that multiple servers may be present, as illustrated by the social network server 102n, each with functionality similar to social network server 102a or different.

The term "social network" as used here encompasses its plain and ordinary meaning including, but not limited to, any type of social structure where the users are connected by a common feature or link. The common feature includes relationships/connections, e.g., friendship, family, work, a similar interest, etc. The common features are provided by one or more social networking systems, such as those included in the system 100, including explicitly-defined relationships and relationships implied by social connections with other online users, where the relationships form a social graph.

The term "social graph" as used here encompasses its plain and ordinary meaning including, but not limited to, a set of online relationships between users, such as provided by one or more social networking systems, such as the social network system 100, including explicitly-defined relationships and relationships implied by social connections with other online users, where the relationships form a social graph. In some examples, the social graph may reflect a mapping of these users and how they are related.

It should be understood that the social network server 102a and its social network software/application are representative of a single social network. Each of the plurality of social network servers 102a through 102n is coupled to the network 106, each having its own server, application, and social graph. For example, a first social network hosted on a social network server 102a may be directed to business networking, a second on another social network server may be directed to or centered on academics, a third on a another social network server 102c directed to local business, a fourth on a social network server directed to dating, and yet others on social network server 102n directed to other general interests or perhaps a specific focus. Typically, a social network server includes a profile server, which has profiles for all the users that belong to a particular social network 102a-102n. Embedded digital media tools assist users (editors, publishers, or viewers) broadcast about particular channels created or media or interest.

A web server 114 is connected, via line 116, to the network 106. The web server 114 provides access to the social network servers 102a through 102n or the channel creation server 120.

Figure 2:
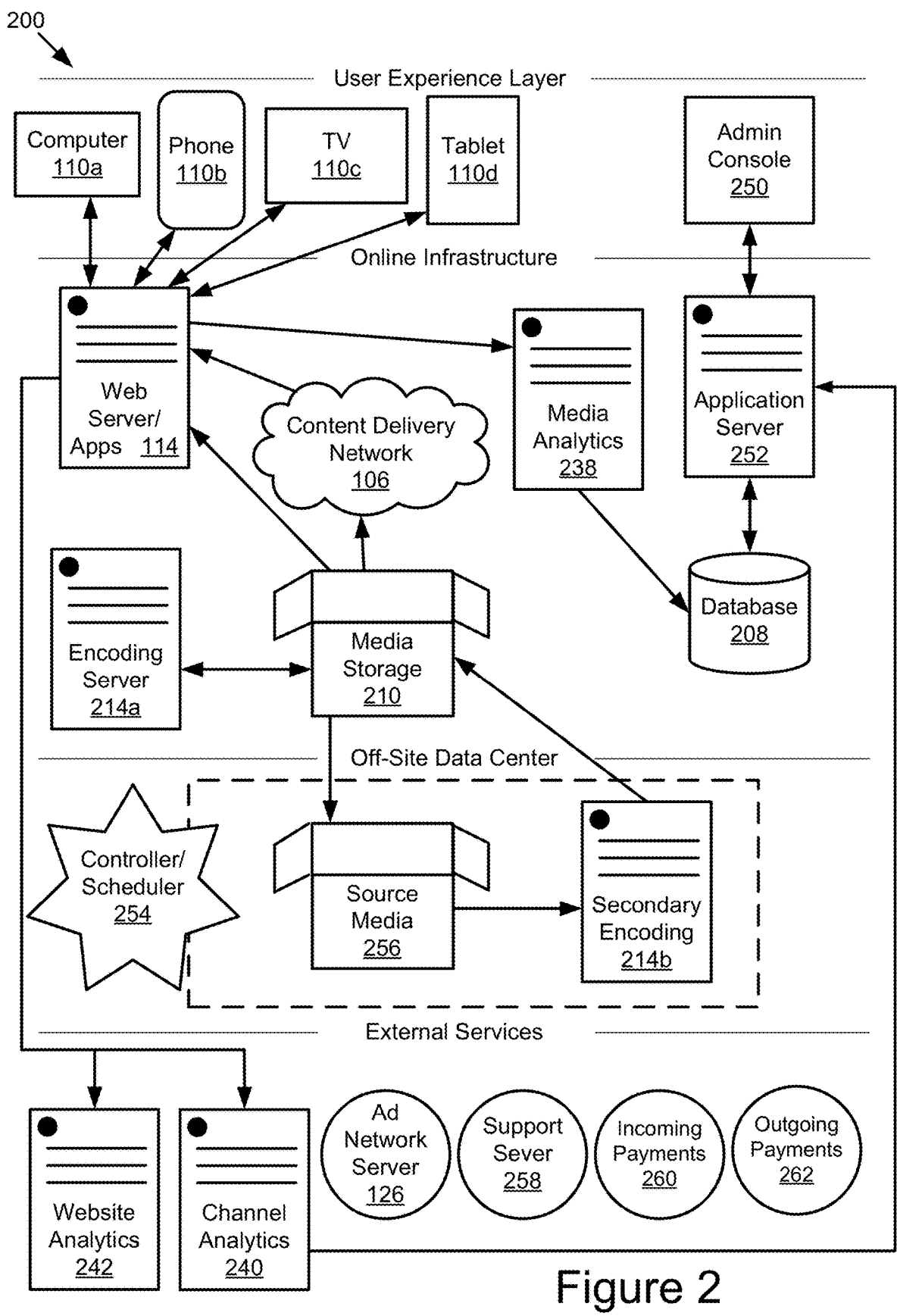
FIG. 2 is a graphical representation of the distributed architectural infrastructure of the systems shown in FIG. 1.

The advertiser server 126 may be coupled to the channel creation server 120, through the network 106, as indicated by a line 130, and it provides the advertiser support for that option provided to users when they request the channel creation server 120 to create channels. As illustrated in FIG. 2, the advertiser server 126 is also referred to as an "Ad Network Server" to indicate that it may be configured as a network of advertising entities. The pay-per-view server 128 may be coupled to the channel creation server 120, through the network 106, as indicated by a line 132 and it provides the pay-per-view option that is presented to the users. The subscription media server 128 may be coupled to the channel creation server 120 through the network 106 via line 134 and it supports the subscription option that is provided to the users. Referring now to FIG. 2 other third party servers may also be communicatively coupled to the channel creation servers, for example, a support server 258, a server for incoming payments 250 and a server for outgoing payments 262. All incoming payments generated by either of the options, for example, by advertisers, pay-per-view, or subscriptions are received and tracked by the incoming payments server 260. All outgoing payments to the editors, contributors, platform providers etc., are provided by the outgoing payments server 262. In addition, there is a support server 258 (FIG. 2) for all other aspects that may require support and an encoding server 214a (FIG. 2).

As further illustrated in FIG. 2, the user devices 110a through 110n are shown in series in the user experience layer of the system architecture. These may be located at remote locations, but have access via the web server 114, either through browser technology of applications ("apps") that are available on the devices. The user devices 110a through 110n may be a computing device, for example, a computer 110a (either a laptop or desktop), a mobile telephone 110b, a television with one or more processors embedded in the television or coupled to it (110c), a tablet 110d, or any other electronic device capable of accessing a network for example, a personal digital assistant (PDA), a mobile email device, a portable game player, a portable music player, or the like.

The network 106 (also referred to as content delivery network in FIG. 2) is of conventional type, wired or wireless, and may have any number of configurations such as a star configuration, token ring configuration, or other configurations known to those skilled in the art. Furthermore, the network 106 may comprise a local area network (LAN), a wide area network (WAN, e.g., the Internet), and/or any other interconnected data path across which one or more devices may communicate.

In another embodiment, the network 106 may be a peer-to-peer network. The network 106 may also be coupled to or include portions of one or more telecommunications networks for sending data in a variety of different communication protocols.

In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

In some embodiments, the social network servers, 102a-102n, the channel creation server 120, the web server 132, and any or all of the third party servers, for example, the advertiser server 126, the pay-per-view server 128, the subscription media server 128, the support server, the encoding server 214a, are hardware servers including a processor, memory, and network communication capabilities. One or more of the users 112a through 112n access the channel creation server 120 or any of the social network servers 102a through 102n, via browsers in their user devices and via the web server 114. The channel creation server 120 includes a content management and delivery platform 122 and a user profile server, which stores all the information required for each user (editor, author or publisher and viewer).

As one example, in some embodiments of the system, the channel creation server 120 hosts or manages one or more channels created by any of users 112a through 112n, via their user devices 110a through 110n. The channel creation server 120 includes a content management and delivery platform 122 and a user profile server 124.

FIG. 2 is a block diagram illustrating the various layers in the system architecture indicated generally by reference numeral 200. In FIG. 2, like reference numerals are used to reference like components with the same or similar functionality that has been described above with reference to FIG. 1. In the event those components have been described above that description is not repeated here. A user experience layers includes the user devices 110a through 110d and an administrative console 250. The online infrastructure includes the web server 114, which may include a myriad of applications ("apps"). Users 112a through 112n may access the network 106, specifically indicated here as a content delivery network, via the web server 114. The third party servers described above provide external services, as desired, by the channel creation server 120. A website analytics application or engine 242 is communicatively coupled to the web server 114 and compiles the data to enable determining analytics that will assist the users. A channel analytics application or engine 240 is also communicatively coupled to the web server 114 and compiles analytics on editors, publishers, and viewers, and compiling that data for the application server 252. FIG. 2 also illustrates an off-site data center including a controller scheduler 254 for controlling schedules, a source media 256 to represent a source for the media, which is encoded by a secondary encoding application 214b and provided to media storage 210. The media storage 210 is communicatively coupled to the encoding server 214a, which is responsible for encoding media before making it available. The media storage 210 stores the media provided by either an editor or author or by one or more contributors to a particular editor or author channel. A media analytics application 238 receives and compiles data for analytics on users via the web server 114 and provides it to database 208, which is communicatively coupled to application server 252. The application server 252 is communicatively coupled to an admin console 250, which provides the tools necessary for users to manage content, view analytics, and operate their respective channels.

Figure 3:
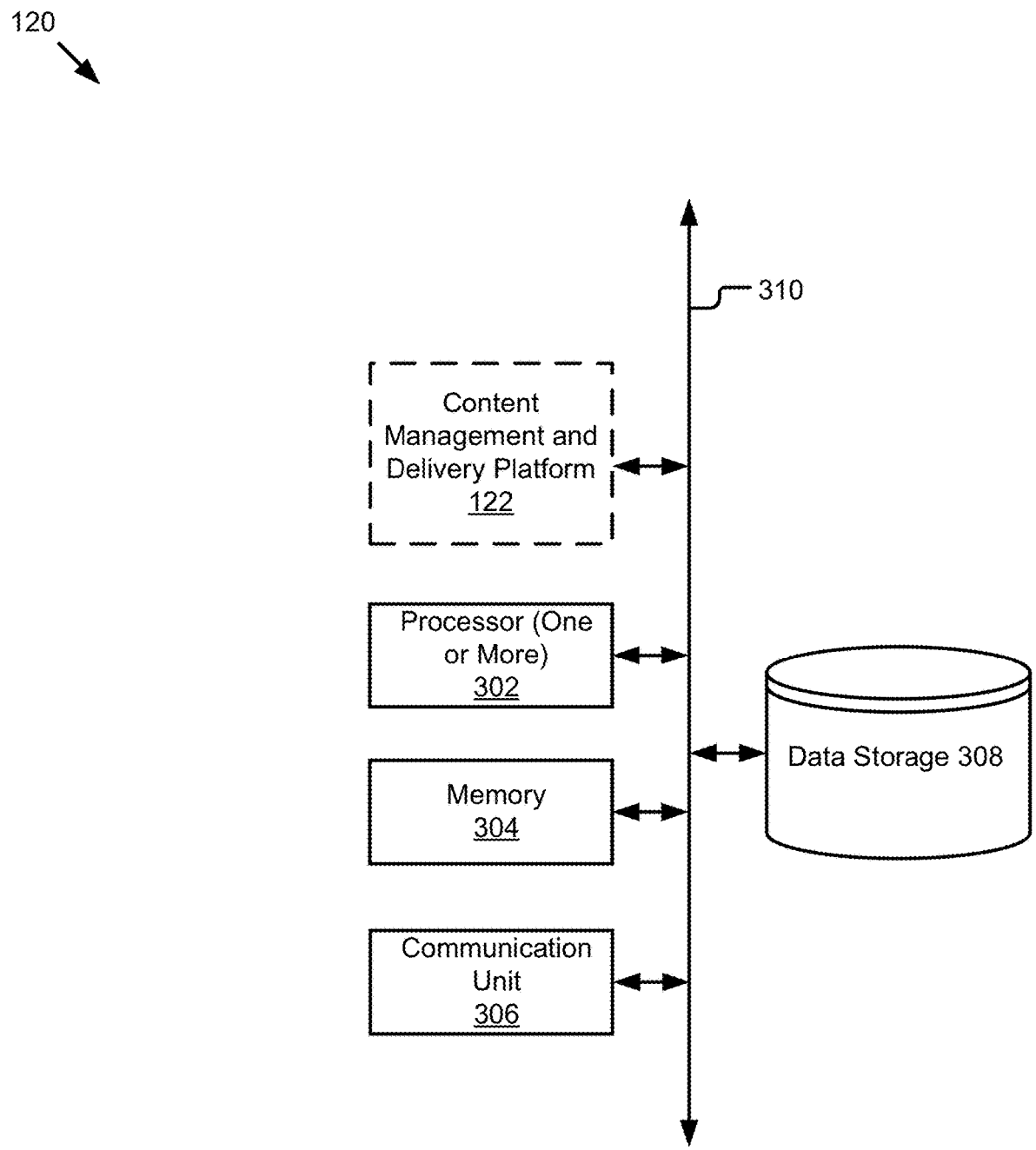
FIG. 3 is a block diagram illustrating an example channel creation server of the systems shown in FIG. 1 and its hardware components.

Referring now to FIG. 3, an example hardware configuration for the servers illustrated and described above is shown. Each of the servers may include the same components illustrated other than the channel creation server 120, which includes the content management and delivery platform (shown with broken lines to denote that it is not required in any of the other servers described). The channel creation server 120 (or any of the other servers) generally includes one or more processors, although only one processor 302 is illustrated in FIG. 2. The processor 302 is coupled, via a bus 310, to memory 304 and data storage 308 (which may include database 208 and media storage 210 shown in FIG. 2 or these may be remotely located), which stores information. In some embodiments, the data storage 308 may be organized by users (either partially or entirely) when creating channels. In other embodiments, the content management and delivery platform provider 122 (shown in FIG. 1 and with broken lines in FIG. 2) may organize the data, either with input from users, or entirely on its own. In some embodiments, the memory 304 may store the software operating routines that control operations of the channel creation server 120. A communication unit 306 communicatively couples the servers to network 106.

Figure 4A:
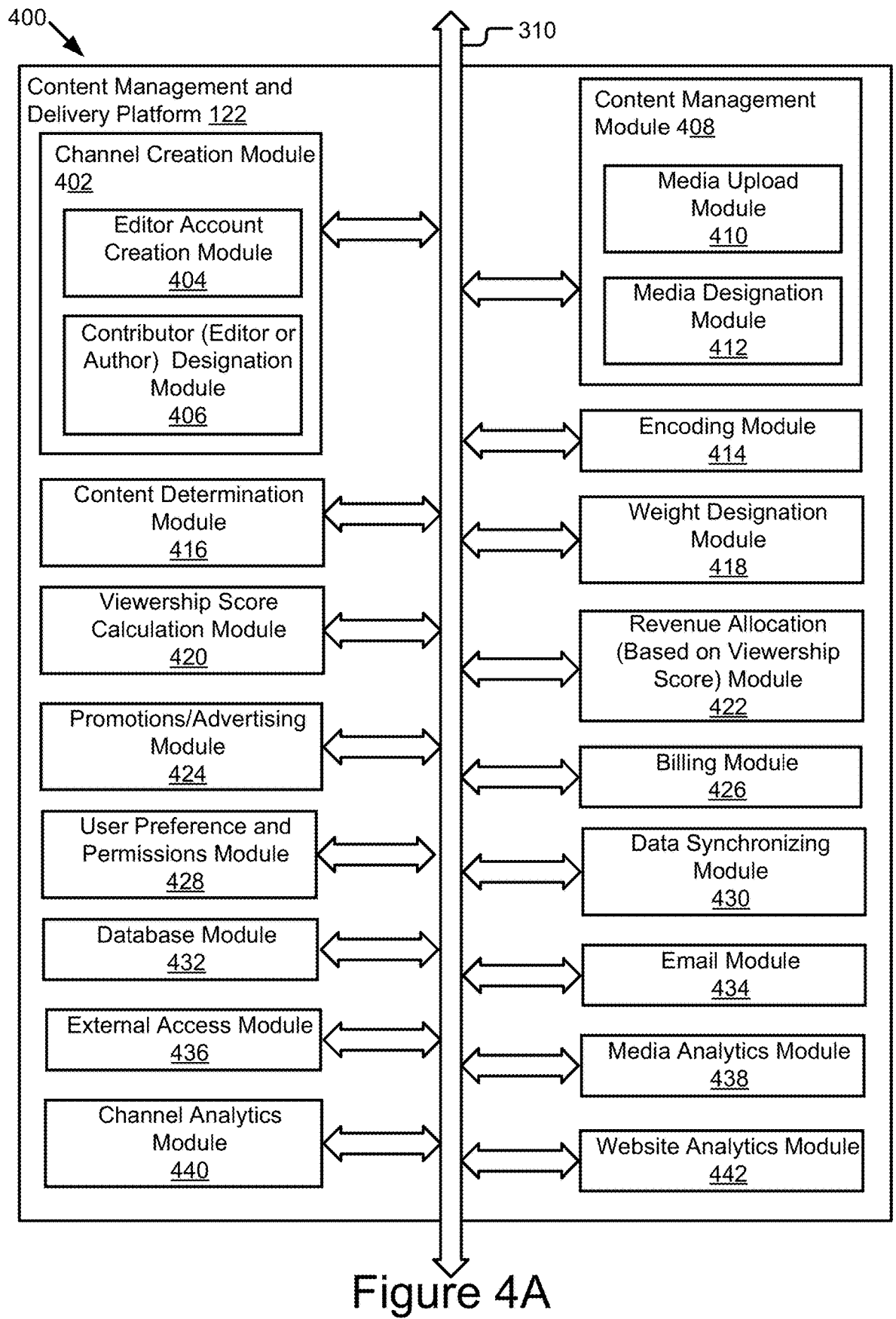
FIG. 4A is an example content management and delivery platform of the example channel creation server (shown in FIG. 3) and its software components.

Referring now to FIG. 4A, the content management and delivery platform 122 is illustrated in greater detail, where like reference numerals have been used to reference like components with the same or similar functionality that has been described above with reference to FIGS. 1 and 2. The content management and delivery platform 122 may include various applications or engines that are programmed to perform the functionalities described here.

Figure 4B:
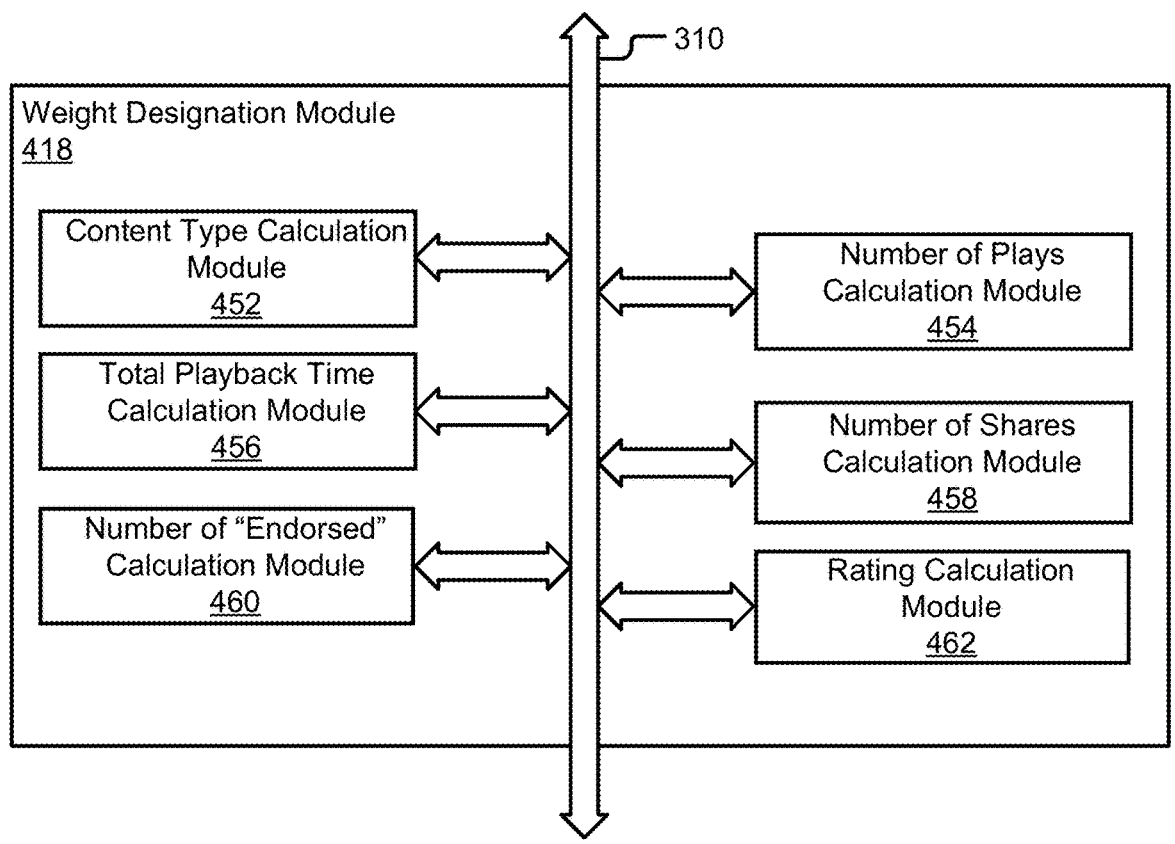
FIG. 4B is an example weight designation module (shown in FIG. 4A) and its software components.

The content management and delivery platform include applications or engines that communicate over the software communication mechanism 310. Software communication mechanism 310 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communication can be implemented on any underlying hardware, such as a network, the Internet, a bus 310 (FIG. 3), a combination thereof, etc. The content management and delivery platform includes a channel creation module 402, which creates a channel upon a user request. The channel creation module 402 includes an editor account creation module 404 and a contributor designation module 406. The contributor designation module 406 designates a user requesting to initiate a channel as an "editor" and designates a user supplementing content to an existing channel as an "author" or "publisher." The editor account creation module 404 sets up an editor account. The channel creation module 402 is communicatively coupled to the bus 310. Once a channel is created, the content management module 408 is configured to permit the user to upload content or media and designates the media type. The content management module 408 includes a media upload module 410 and a media designation module 412. The media upload module 410 facilitates uploading of media onto a channel that is created. The media designation module 412 designates the particular media type (for example, audio, video, text etc.). Any media that is uploaded is encoded by an encoding module 414. A content determination module 416 determines the type of content that is designated in order to assign weight designations to the content, which is performed by a weight designation module 418. Weight designations are assigned based on criteria for assessing content and may vary. The weight designation module 418 comprises multiple calculation modules (illustrated in FIG. 4B) for calculating the weights for each criterion. The content type calculation module 452 calculates weights based on the type of content. For example, audio content may be assigned a weight or "3," video content may be assigned a weight of "4," content that is text may be assigned a weight of "2," and HD video may be assigned a weight of "5." Weight designations may also be assigned based on social network signal types. The number of plays calculation module 454 calculates weights based on the number of times the content has been played or viewed. For example, a "number of plays" of particular content, may be assigned a weight of "2." The total playback time calculation module 456 calculates weights based on the total playback time from all users. A "total playback time (e.g., total number of seconds the media has been played by all users)" may be assigned a weight of "6." For example, a video five minutes long is played 3 times (e.g., in a month, year, all-time etc.) by three different users. The first user plays it for 90 seconds, the second user plays it for 30 seconds, and the third user plays it for the entire 5 minutes; therefore the "total playback time" is 420 seconds (i.e., 7 minutes). The number of shares calculation module 458 calculates weights based on the number of times the content has been shared. A "number of times shared on social networks" may be assigned a weight of "3." The number of "endorsed" calculation module 460 calculates weights based on the number of times the content has been endorsed (e.g., "favorited"). A "number of times endorsed" may be assigned a weight of "4." The rating calculation module 462 calculates weights based on the number of "likes" and "dislikes" related to the content. A rating to indicate whether a particular piece of content is "liked" or "disliked" by a viewer may be assigned a weight of "5." The content management and delivery platform 120 also includes a viewership score calculation module 420, which determines viewership scores for the editor or publisher, depending upon the extent of viewing, sharing, downloading, etc. of each item of content that on a particular channel. A revenue allocation module 422 computes revenue amounts based on the viewership scores. The content management and delivery platform 122 also includes a promotions/advertising module 424 for coordinating promotions and advertising relating to particular channels, editors, authors, or content. A billing module 426 coordinates payment schemes with the incoming payments server 260 and the outgoing payments server 262. A user preference and permissions module 428 receives user preferences and permissions relating to display of content. The content management and delivery platform 122 further includes a data synchronizing module 430 (for synchronizing flow of data and communications to and on a channel), a database module 432 (for storing necessary data including media or whatever), and an email module 434 to enable communications among the users and the content management and delivery platform 120. An external access module 436 is communicatively coupled to the third party servers described here, for example, the incoming payments server 260 and the outgoing payments server 262. A media analytics module 438 (in communication with media analytics application 238 shown in FIG. 2), receives data for the media analytics and performs analysis to provide the users and platform providers with useful information. A website analytics module 442 receives information from the website analytics application 242 and analyzes data and generates data to inform users and platform providers for future decisions. A channel analytics module 440 receives data from the channel analytics application 240 and analyzes the data to generate useful information relating to the channels.

Example Methods

Figure 5A:
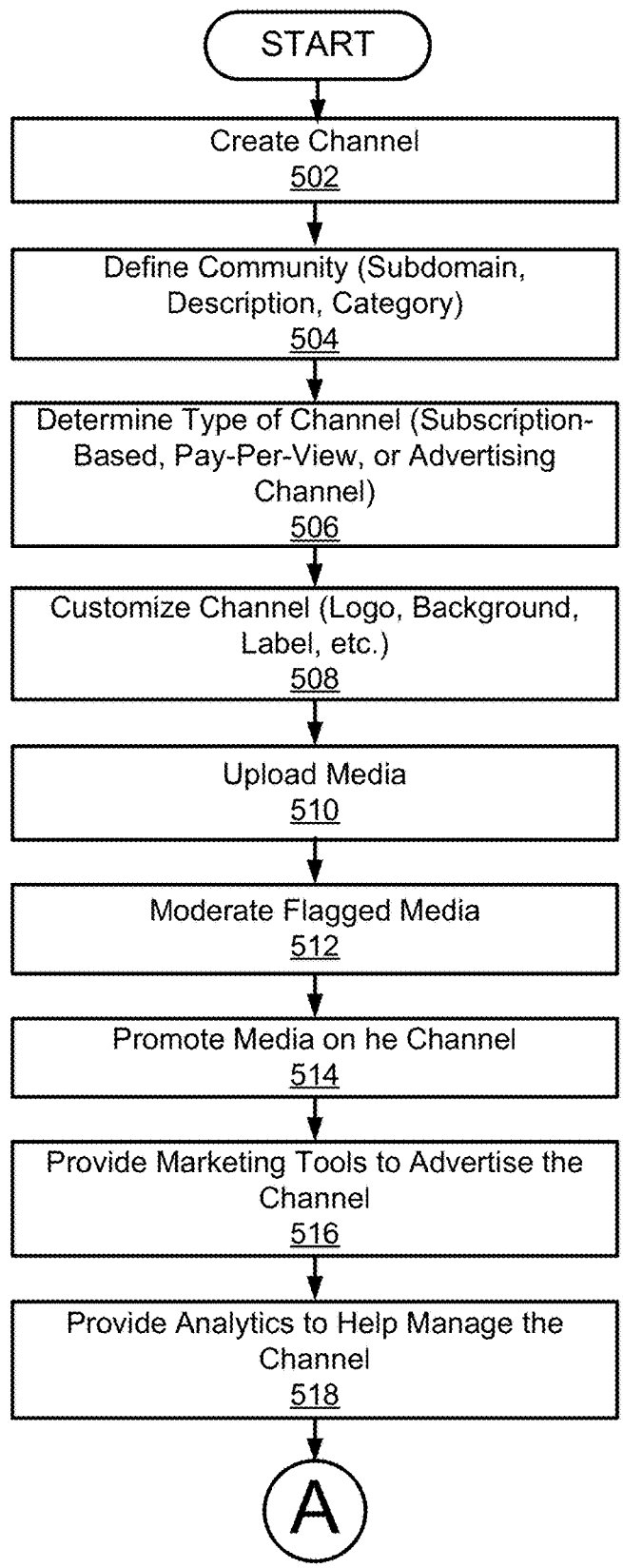
FIG. 5A is a first half of a flow chart of an example general method for creating and managing social content or media.

FIG. 5A is a flow chart illustrating an example general method, indicated by reference numeral 500 for permitting a user to stream digital media by creating an individual channel. In the method illustrated, operations begin and proceed to a block 502, where users create a channel. To create a channel, users may sign up or send in a login request to the channel creation server 120, which may provide access to those who are interested via a web page. The method proceeds to the next block 504, at which stage, one or more operations of the method request the user to define a community, by indicating a subdomain, description, or category. The method proceeds to the next block 506, at which stage, one or more operations of the method request the user to specify the type of channel the user desires. As one example, the options for the channel types that are provided to the user include a "subscription-based" channel, a "pay-per-view" channel, and an "advertising" channel. The method proceeds to the next block 508, at which stage, one or more operations of the method invite the user to customize the channel, for example, by uploading a logo, providing or selecting a background image, providing a label etc. At this point the channel is created and the method proceeds to the next block 510, at which stage, one or more operations of the method request the user to upload media or content. The user may upload content or digital media, add metadata, set revenue models and pricing, etc. The method proceeds to the next block 512, at which stage, one or more operations of the method moderate media that is flagged. These operations include reviewing media to determine if any particular content or media is flagged as in appropriate by viewers or other users. The method proceeds to the next block 514, at which stage, media on that particular channel may be promoted in a myriad of ways. For example, a particular contributor, a category, or a piece of media may be promoted or endorsed. The method proceeds to block 516, at which stage, one or more operations of the method provide marketing tools to advertise user channels, for example, via social networks or other online communities. The method proceeds to the next block 518, at which stage, one or more operations of method provide analytics to users that they may desire to help manage their channels.

Figure 5B:
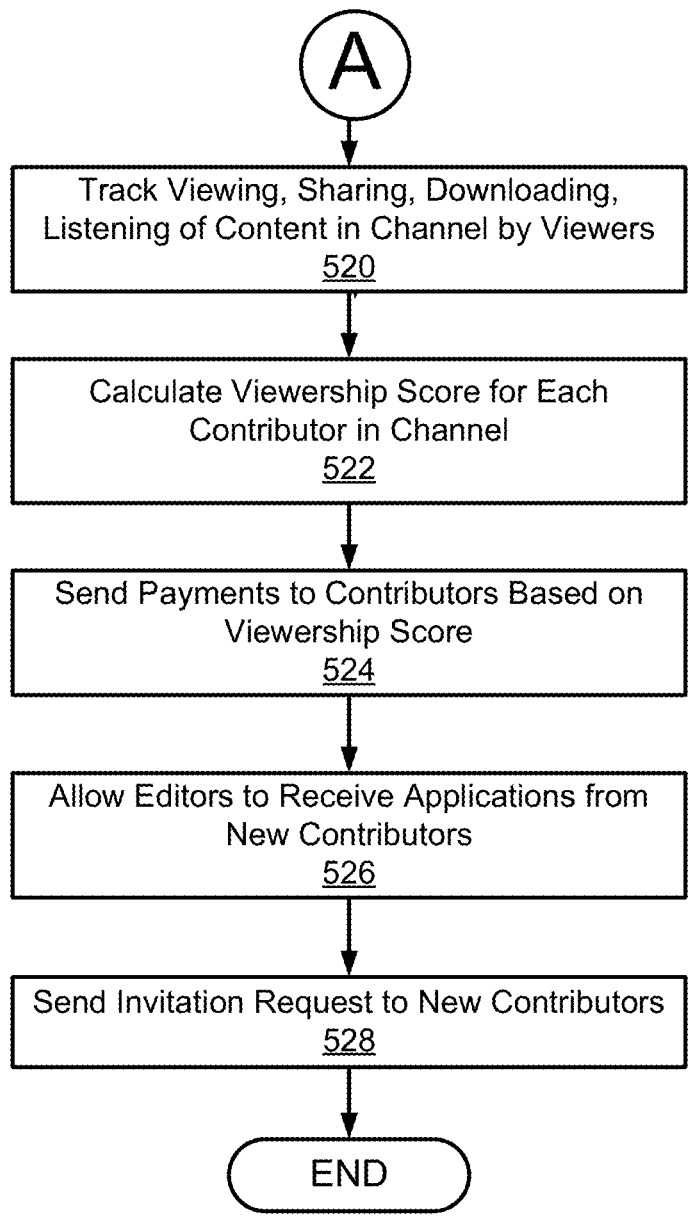
FIG. 5B is a second half of the flow chart of an example method for creating and managing social content or media.

Referring now to FIG. 5B, the method continues (as indicated by a connector indicated by reference numeral A). The method continues to block 520, at which stage, one or more operations of the method track viewing, sharing, downloading, etc., of content in a user channel by viewers. For example, viewers may be an audience or anyone interested in the particular subject to which the content relates. The method proceeds to the next block 522, at which stage, a viewership score is calculated for each contributor in a user channel. The method proceeds to the next block 524, at which stage, one or more operations of the method, payments according to a particular payment scheme are determined and sent to each of the contributors based on viewership scores. The method proceeds to the next block 526, at which stage, users who may be editors are allowed to receive applications from new contributors. The method proceeds to the next block 528, at which stage, one or more operations of the method send an invitation request to new contributors, inviting them to stream their digital content via existing user channels.

Figure 5C:
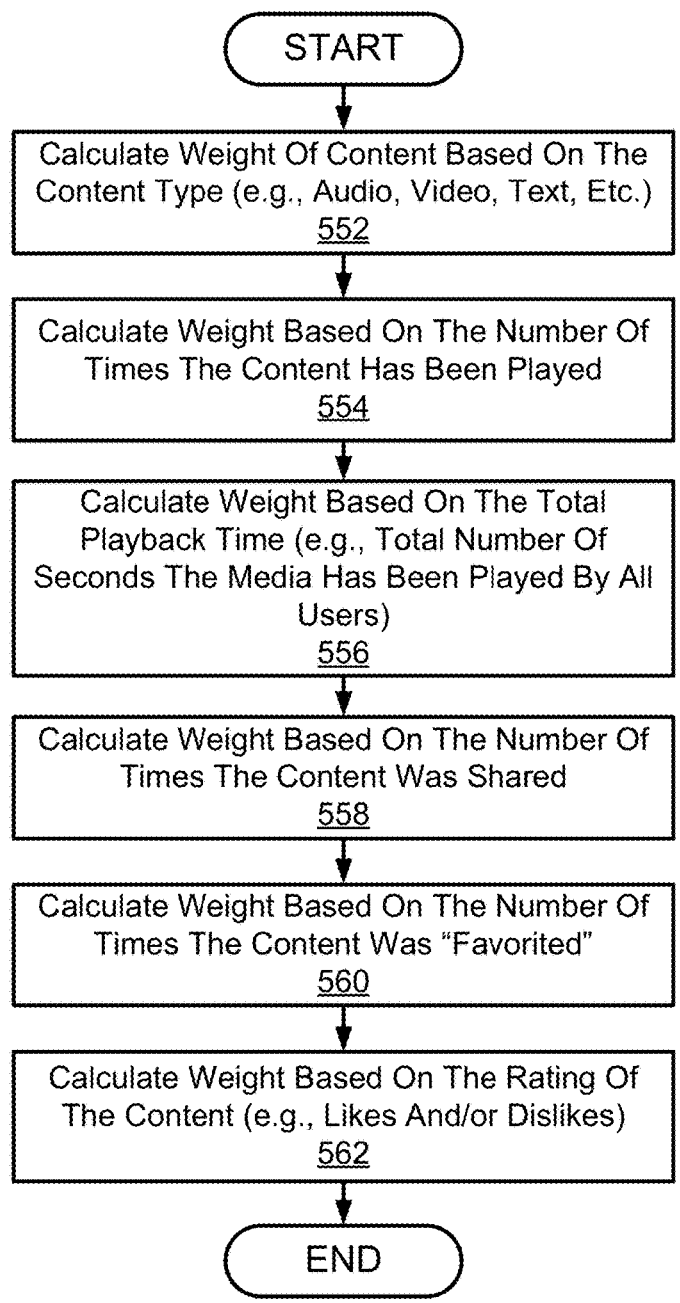
FIG. 5C is a flow chart of an example method for determining weights for the content.

FIG. 5C is a flow chart illustrating an example general method, indicated by reference numeral 500 for determining weights for the content. In the method illustrated, operations begin and proceed to a block 552, where the method calculates the weight of the content based on the content type (e.g., audio, video, text, etc.). The method proceeds to the next block 554, at which stage, one or more operations of the method calculates the weight of the content based on the number of times the content has been played/viewed. The method proceeds to the next block 556, at which stage, one or more operations of the method calculates the weight of the content based on the total playback time (e.g., total number of seconds the media has been played by all users). The method proceeds to the next block 558, at which stage, one or more operations of the method calculate the weight of the content based on the number of times the content was shared. The method proceeds to the next block 560, at which stage, one or more operations of the method calculate the weight of the content based on the number of times the content was endorsed (e.g., "favorited"). The method proceeds to the next block 562, at which stage, one or more operations of the method calculate the weight of the content based on the rating of the content (e.g., likes and/or dislikes).

FIG. 6A illustrates a table with example criteria for assessing content indicated generally by reference numeral 602, for example, by providing weight assignments to particular content. In the illustrated example, weight assignments vary, for example, audio content may be assigned a weight or "3," video content may be assigned a weight of "4," content that is text may be assigned a weight of "2," and HD video may be assigned a weight of "5."

FIG. 6B illustrates a table with example criteria for assigning weights to social network signal types indicated generally by reference numeral 604. For example, a "number of plays" of particular content, may be assigned a weight of "2." A "total playback time (e.g., total number of seconds the media has been played by all users)" may be assigned a weight of "6." For example, a video five minutes long is played 3 times (e.g., in a month, year, all-time etc.) by three different users. The first user plays it for 90 seconds, the second user plays it for 30 seconds, and the third user plays it for the entire 5 minutes; therefore the "total playback time" is 420 seconds (i.e., 7 minutes). A "number of times shared on social networks" may be assigned a weight of "3." A "number of times endorsed" may be assigned a weight of "4." A rating to indicate whether a particular piece of content is "liked" or "disliked" by a viewer may be assigned a weight of "5."

FIG. 6C is a table illustrating an example of how revenues that are generated may be split between various parties participating in creating and managing channels, for example, a platform provider, an editor, authors, etc. This table is indicated generally by reference numeral 606. The split may be computed based on a predefined payment scheme. In the example shown, the platform provider is provided 30% of the revenues generated, the editor is provided with 10% of the revenues generated, and authors are provided 60% of the revenues generated.

Examples of Graphical User Interfaces

Figure 7:
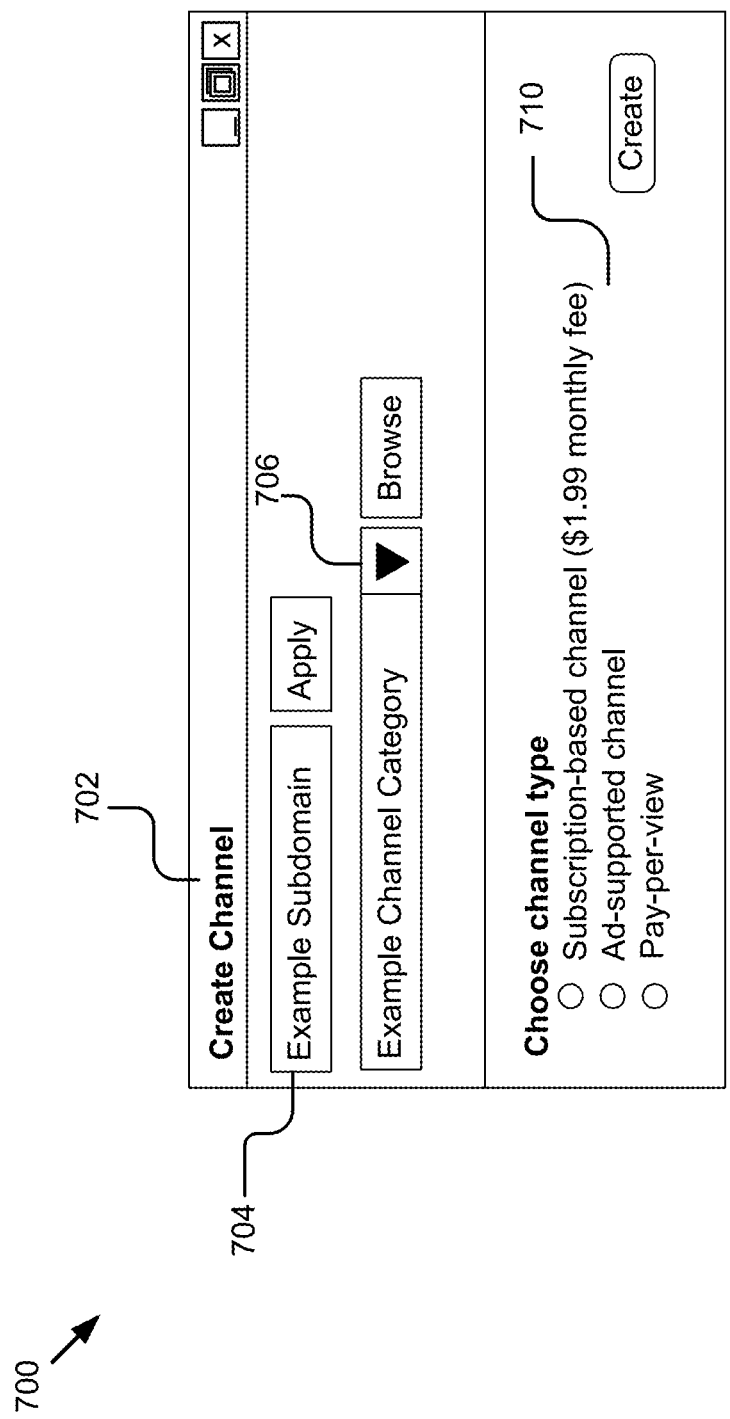
FIG. 7 is a graphical representation of an example user interface display illustrating an initial display for creating a channel.

FIGS. 7 through 12 illustrate example user interfaces that are provided for display to the various users that may create channels. FIG. 7 illustrates a user interface indicated generally by reference numeral 700 that may be provided for display to a user who desires to create a channel. The user interface 700 includes a caption area for indicating the purpose, that is, to create a channel. This caption area may indicate "Create Channel." The user interface 700 may provide an area indicated by reference numeral 704 in which a user may enter a subdomain, by pushing a button "Apply." Another drop box area indicated by reference numeral 706 permits a user to browse (by pushing a button "Browse") through examples of channel categories. As indicated by reference numeral 710, the channel types may be subscription-based, ad-supported, or pay-per-view based, and a user may indicate his or her preference by pushing a button that indicates "Create."

Figure 8:
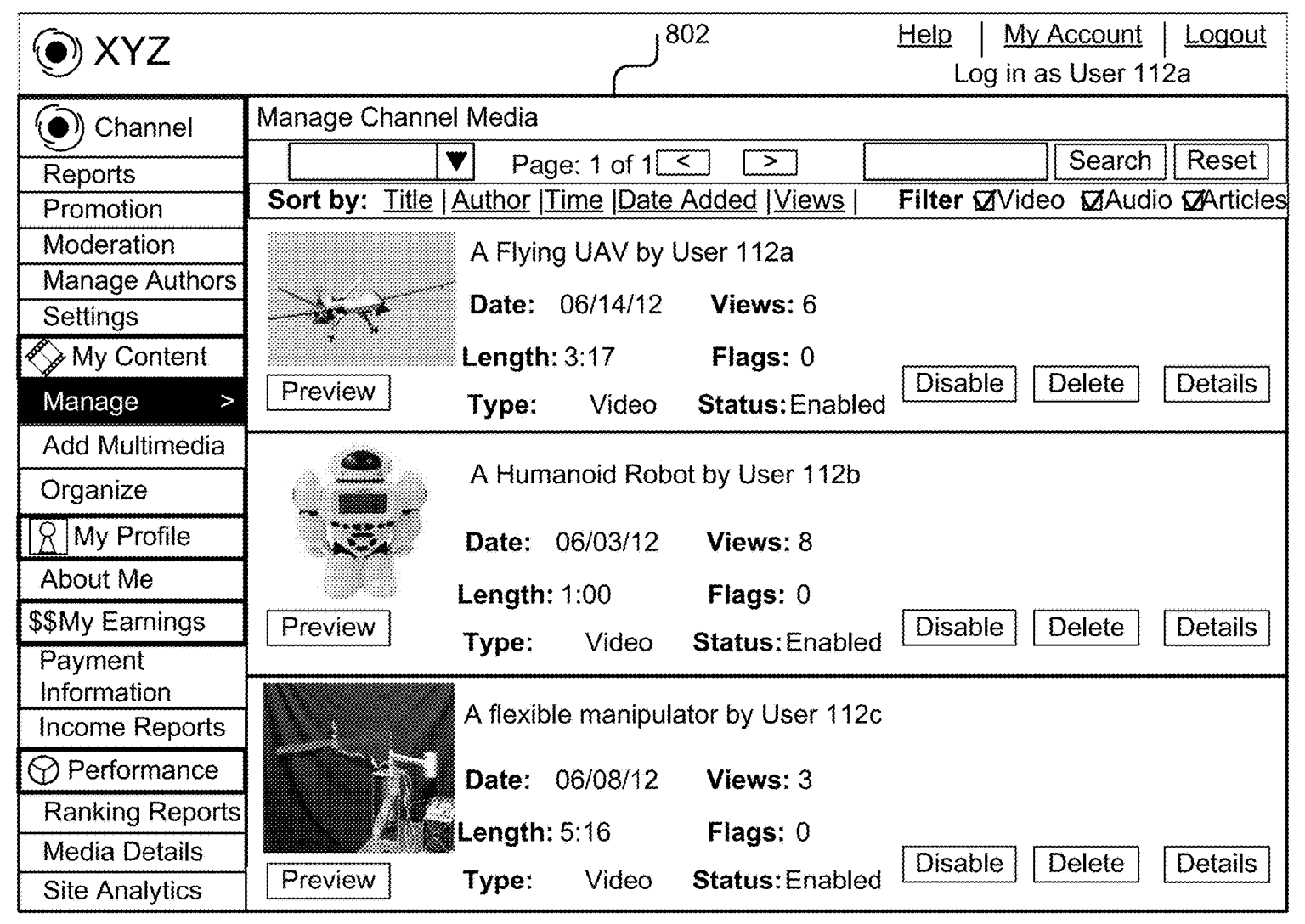

FIG. 8 illustrates an example user interface for a particular user "XYZ" (an "editor") who has successfully created a channel as indicated by reference numeral 802. This example user interface displays various features and options that may be provided for display to the "editor" to assist the "editor" manage his or her channel and the media displayed on it for viewing, sharing, downloading, etc. The features that relate to managing a channel may include provision of reports, promotions, moderation (for example, of content), manage authors, settings, or the like. The features that relate to managing content may include add multimedia, organize, my profile, about me, my earnings or the like. The features that may relate to payment information include payment information, income reports, performance, ranking reports, media details, site analytics or the like. In addition, the example user interface includes a sort feature that permits a user to sort by title, author, a time, a date added, views, or the like. There may be a filter feature that permits filtering of the video, audio, and articles. A preview feature may display an image relating to the content, the date it was uploaded, length, number of views, flags, type, status or the like. Additional buttons relating to the preview feature are provided, for example, "Disable," "Delete," and "Details." FIG. 8 illustrates a preview of three different items of content on free video that are on display.

Figure 9:
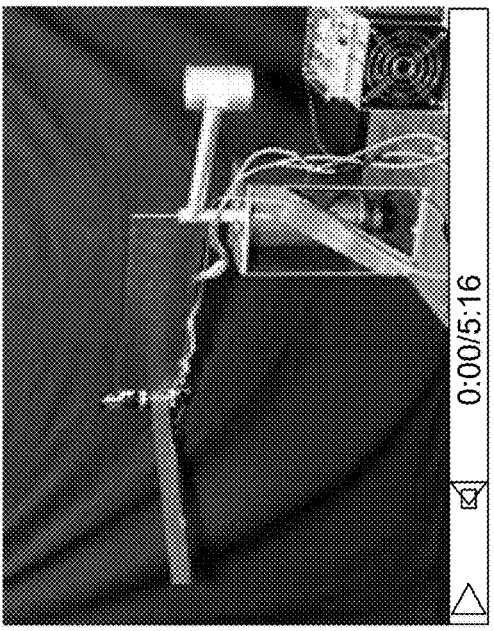
FIG. 9 is a graphical representation of an example user interface illustrating various features for managing the channel media (or content).

FIG. 9 illustrates another example user interface for a particular user "XYZ" indicated generally by reference numeral 902 configured to permit an editor to manage the media on a channel. For example, the user interface may provide information including a title, a description, a category, tags, a date, a type, options to either save the content or add search markers etc. The user interface indicates that this content is supported by advertising. There is an option to change the type and there are buttons to disable and reset.

Figure 10:
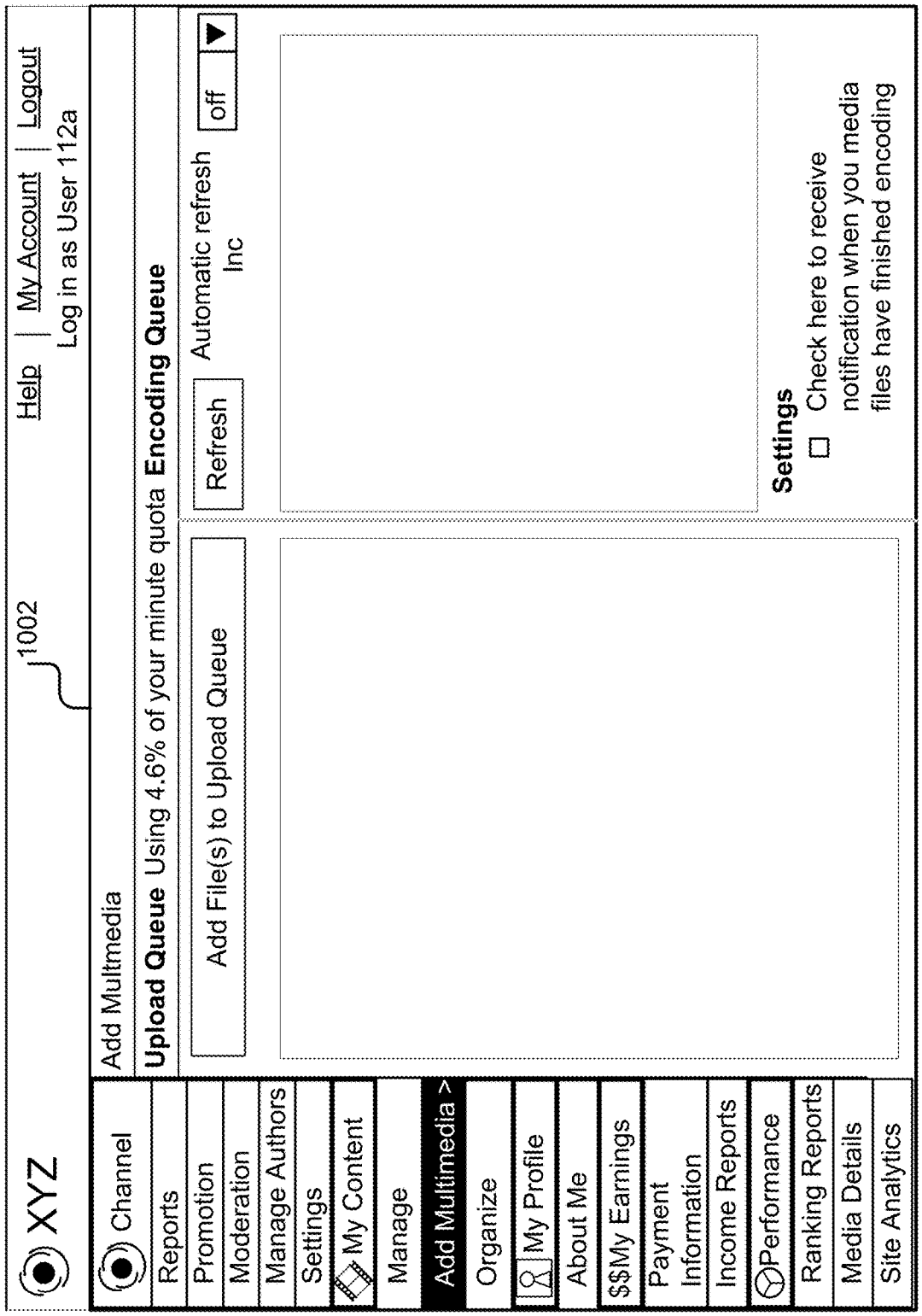
FIG. 10 is a graphical representation of an example user interface display illustrating features relating to adding multimedia or content.

FIG. 10 illustrates yet another example user interface for a particular user "XYZ" indicated generally by reference numeral 1002 configured to permit a contributor (author or publisher) to add media on this channel. For example, the user interface may provide a box to indicate the files for uploading to a queue, and buttons that provide options for automatic refreshing and manual refreshing. There is also a box that may be checked if it is desired to receive notification when the media files that have been uploaded are finished encoding. The user interface indicates that this content is supported by advertising. There is an option to change the type and there are buttons to disable and reset.

Figure 11:
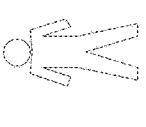
FIG. 11 is a graphical representation of an example user interface illustrating an author listing.

FIG. 11 illustrates another example user interface for a particular user "XYZ" indicated generally by reference numeral 1102 configured to indicate an author list, features for adding or inviting new authors, and author applications. This author list also indicates users who have actively uploaded content. An author biography is also indicated as are features to activate, disable, or remove an author and his or her content.

Figure 12:
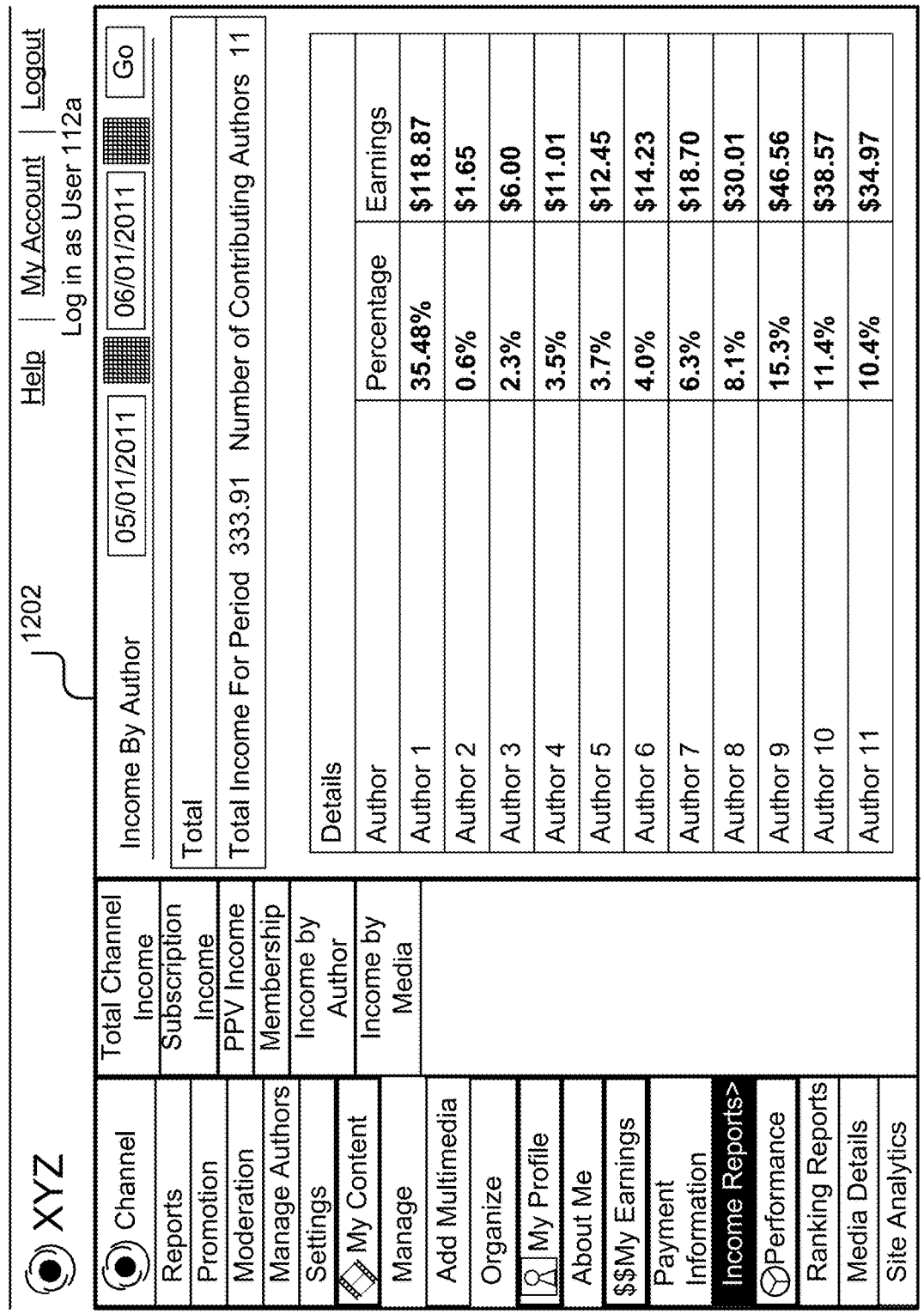
FIG. 12 is a graphical representation of an example user interface illustrating the revenue allocation and a list of contributing authors who receive portions of the allocation.

FIG. 12 illustrates yet another example user interface for a particular user "XYZ" indicated generally by reference numeral 1202 configured to report the income or payment allocations for each author. The income or payment allocations are reported by a percentage amount and earnings.

The foregoing description of the embodiments or implementations of the present technology has been presented for the purposes of illustration and description. It is not intended to be exhaustive nor limit the present technology to the precise forms disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the modules, routines, features, attributes, methodologies and other aspects of the present technology may be implemented as software, hardware, firmware, or any combination of the three. Also, wherever a component, an example of which is a module, of the present technology is implemented as software, the component may be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A method comprising:
  in a computing device coupled to a network accessible by user devices for viewing of digital content and media, said computing device including a processor and memory containing executable code to cause the processor to execute one or more operations via said network to receive a request from a first party user device, to create a single data-streaming channel accessible within said network for providing the digital content and media by the single data-streaming channel via said network, to provide at least a portion of the digital content and media to be accessible to said user devices over the network;
  providing, by said processor and said executable code and executing via said one or more operations, a first party that created the data-streaming channel, with one or more interface features to specify one or more conditions relating to the single data-streaming channel, the interface features including and presenting a first interface for a first channel type for identification by advertisers, a second interface for a second channel type for pay-per-view, and a third interface for a third channel type for subscriptions that are separately tracked for data representative of income allocation after determining an extent of viewing by the users of the digital content and media via said user devices;
  providing, by said processor and said executable code and executing via said one or more operations, a capability for the first party that created the single data-streaming channel to invite a plurality of other parties to contribute to the digital content and media accessible on the data-streaming channel;
  enabling, by said processor and said executable code and executing by said one or more operations, encoding and uploading of the portion of the digital content from the first party that created the data-streaming channel and other portions of the digital content and media from other contributing parties that contribute to the single data-streaming channel by adding additional digital content and media to the portion of the digital content and media streaming over the data-streaming channel;
  determining, by said processor and said executable code and executing by said one or operations, a total playback time for particular content of digital content provided on the single data-streaming channel for access by users who have authorized access to the digital content and media;
  generating, by said processor and said executable code and executing by said operations, respective data representative of individual viewing scores for each of the parties, including the first party that has created the single data-streaming channel and for those contributing parties that added to the single data-streaming channel, based at least in part on, continuous online tracking of the total playback time for particular content of the digital content and media that are viewed;
  measuring, by said processor and said executable code executing said one or more operations for, viewing, sharing, and downloading operations of each contributor's digital content and media;
  responsive to said measuring, computing, by said processor and said executable code and executing by said one or more operations, one or more respective data representative of payment allocation for all the parties, based at least in part on, the respective data representative of viewing scores determined for the particular content of the digital content and media provided for viewing and accessed by said user devices; and
  providing an interface display, by said processor and said executable code and via said one or more operations, to the first party that created the single data-streaming channel by which the first party may select a suitable revenue-payment scheme, add individual particulars and select one or more themes for the single data-streaming channel and the individual, the revenue-payment scheme used to determine individual data representative of revenue for each user.

2. A method according to claim 1, wherein the first party that creates at least one single data-streaming channel is designated as an editor and provided with a capability to invite the other parties to contribute additional digital content to the one single data-streaming channel.

3. A method according to claim 1, wherein at least two of the parties that contribute to one single data-streaming channel are configured for collaboration for the one single data-streaming channel.

4. A method according to claim 1, wherein the digital content and media and include at least one or more of different content types including audio content, video content, text content, and HD content.

5. A method according to claim 4, wherein the different content types including HD content, video content, audio content, and text content are assigned varying weights that are factored into computing of the income allocation for all the parties, wherein varying weights are assigned in descending order from highest to lowest.

6. A method according to claim 1, further comprising:
providing a promotion scheme for promoting the digital content and media on one or more data-streaming channels.

7. A method according to claim 1, further comprising:
providing one or more marketing tools to advertise one or more data-streaming channels.

8. A method according to claim 1, further comprising:
generating analytics for the single data-streaming channel to enable the parties that contribute content to the single data-streaming channel to manage them.

9. A method according to claim 8, wherein the analytics include at least one of data-streaming channel usage signals, including a number of plays of the digital content and media, the total playback time in a predetermined time frame, a number of times the digital content and media is shared on social networks, a number of times the digital content and media is endorsed, and rating by the social networks, including likes and dislikes indicated by the parties.

10. A method according to claim 8, wherein the analytics include data on an individual item of digital content and media.

11. A system comprising:
a computing device coupled to a network accessible by user devices for viewing of digital content and media, said computing device including a processor and memory containing executable code to cause the processor to execute operations via said network and a channel creation module coupled to the network and configurable to 1) receive a request from a first party user device to create at least a single data-streaming channel accessible within said network for providing digital content and media and 2) provide the first party user device that created the channel with a plurality of interface features to specify one or more interface conditions for creation of the single data-streaming channel, the interface features including a first interface feature for display for identification by advertisers, a second interface feature for display for pay-per-view, and a third interface feature for display for subscriptions that are separately tracked for data representative of income allocation;
a user-management interface input coupled to the network and the channel creation module to enable inviting other user devices to contribute digital content to the single data-streaming channel;
a content management module coupled to the user-management interface input and the network and configurable to enable uploading of at least certain content by the first party user device that creates the single data-streaming channel and certain other content by one or more contributing user devices that add other content to the single data-streaming channel, the content management module further configurable to designate the digital content type being streamed;
a viewing score module coupled to the network and configurable to continuously track a total playback time of the digital content on the single data-streaming channel and determine a viewing score for each of the user devices that create the single data-streaming channel and the one or more contributing user devices that add additional digital content to the single data-streaming channel; and
a revenue-allocation module coupled to the network and configurable to compute one or more payment amounts for the first party user device that created the single data-streaming channel and the one or more contributing user devices, based at least in part on, the viewing scores, the first party user device creating the channel provided with an interface by which the first party may select a suitable revenue-payment scheme, add individual particulars and select one or more themes for the data-streaming channel and the payment amount for all parties is determined at predetermined periodic intervals, by measuring the viewing, sharing, and downloading operations of each contributor's content and the revenue-payment scheme used to determine revenues for each user.

12. A system according to claim 11, wherein the user-management platform includes a capability to invite the one or more contributing users to add the other digital content to the single data-streaming channel.

13. A system according to claim 11, wherein at least two users collaborate for providing digital content to the single data-streaming channel.

14. A system according to claim 11, wherein the digital content includes at least one or more of different content types including audio content, video content, text content, and HD content.

15. A system according to claim 14, wherein the different digital content types are assigned varying weights that are factored in the computing of the revenue payment amounts.

16. A system according to claim 11, further comprising:
a promotions and advertising module for providing a promotion scheme for promoting the digital content on one or more data-streaming channels.

17. A system according to claim 16, wherein the promotions and advertising module provides one or more marketing tools to advertise the one or more data-streaming channels.

18. A system according to claim 11, further comprising:
a channel analytics module configured to generate analytics data for the single data-streaming channel to enable users who contribute content to the single data-streaming channel to manage them.

19. A system according to claim 18, wherein the analytics data include one or more of data-streaming channel usage signals, including a number of plays of the digital content, the total playback time in a predetermined time frame, a number of times the digital content is shared on social networks, a number of times the digital content is endorsed, and rating by the social networks, including user likes and dislikes.

20. A system according to claim 18, wherein the analytics data include data representative of an individual item of the digital content.

21. A computer program product for creating and managing one or more channels over a network for streaming media, comprising a computer useable medium including a computer readable program, wherein the computer readable program when executed on a computer causes the computer to:
receive a request from a first party user device to create a single channel;
provide the first party user device with one or more interface features to specify one or more conditions relating to the single channel, the interface features for different channel types including identification by advertisers, pay-per-view, and subscriptions that are separately tracked for income allocation;
provide a capability for the first party user device that creates the single channel to invite one or more other parties to contribute to initial digital content;

enable uploading of certain digital content from the first party user device that creates the single channel and other digital content from other parties that contribute to the single channel;

determine continuously a total playback time for various portions of the digital content provided on the single channel for access by viewers who have purchased access to the digital content;

generate viewing scores for each of the parties, including the first party user device that has created the single channel and the other parties that have added to the single channel, based at least in part on, the total playback time of the various portions of the digital content; and compute payment amounts for the parties, based at least in part on, the viewing scores, the first party user device creating the single channel provided with an interface by which a party may select a suitable revenue payment scheme, add individual particulars and select one or more themes for the single channel and the payment amount for all parties is determined at predetermined periodic intervals, by measuring the viewing, sharing, and downloading operations of each contributor's content and the payment scheme used to determine revenues for each user.

* * * * *